July 3, 1951
W. A. MILLER
2,559,511
OBJECT DETECTION SYSTEM UTILIZING RADIO PULSES
Filed April 27, 1944
3 Sheets-Sheet 2
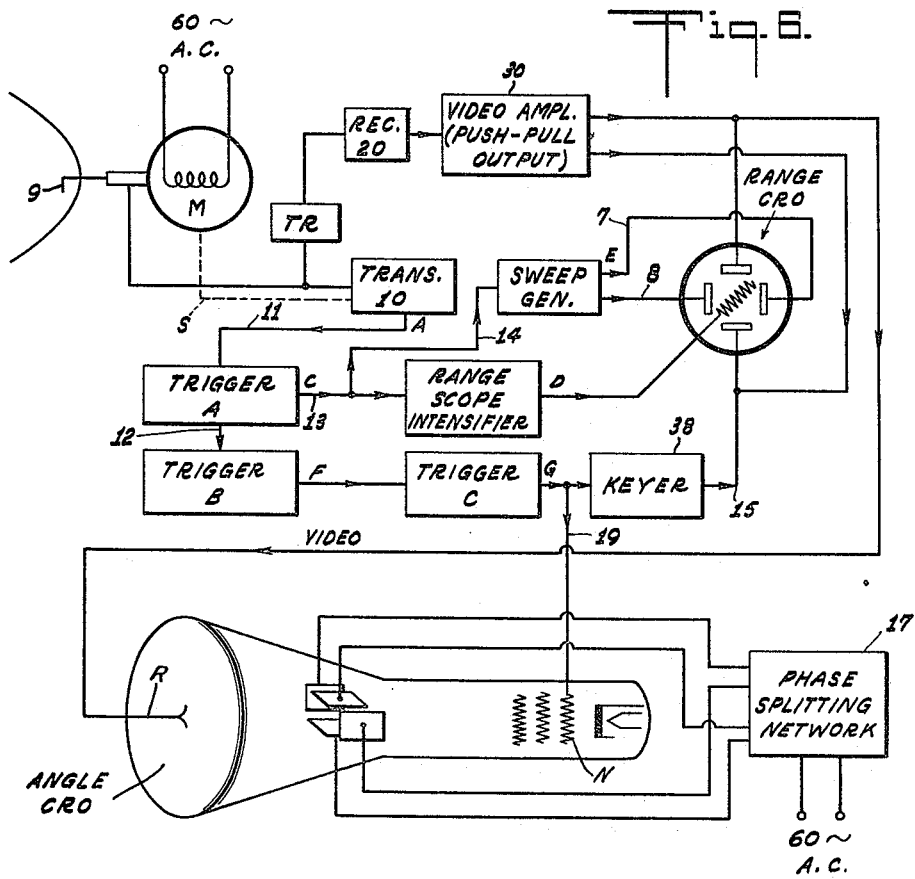
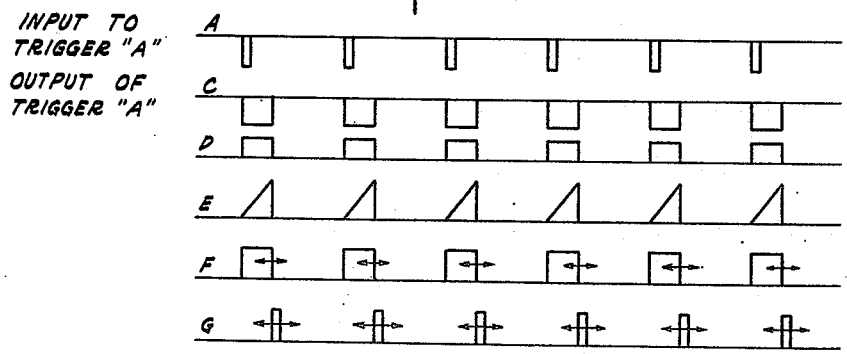
INVENTOR.
WILLIAM A. MILLER
BY
H.S. Grover
ATTORNEY.

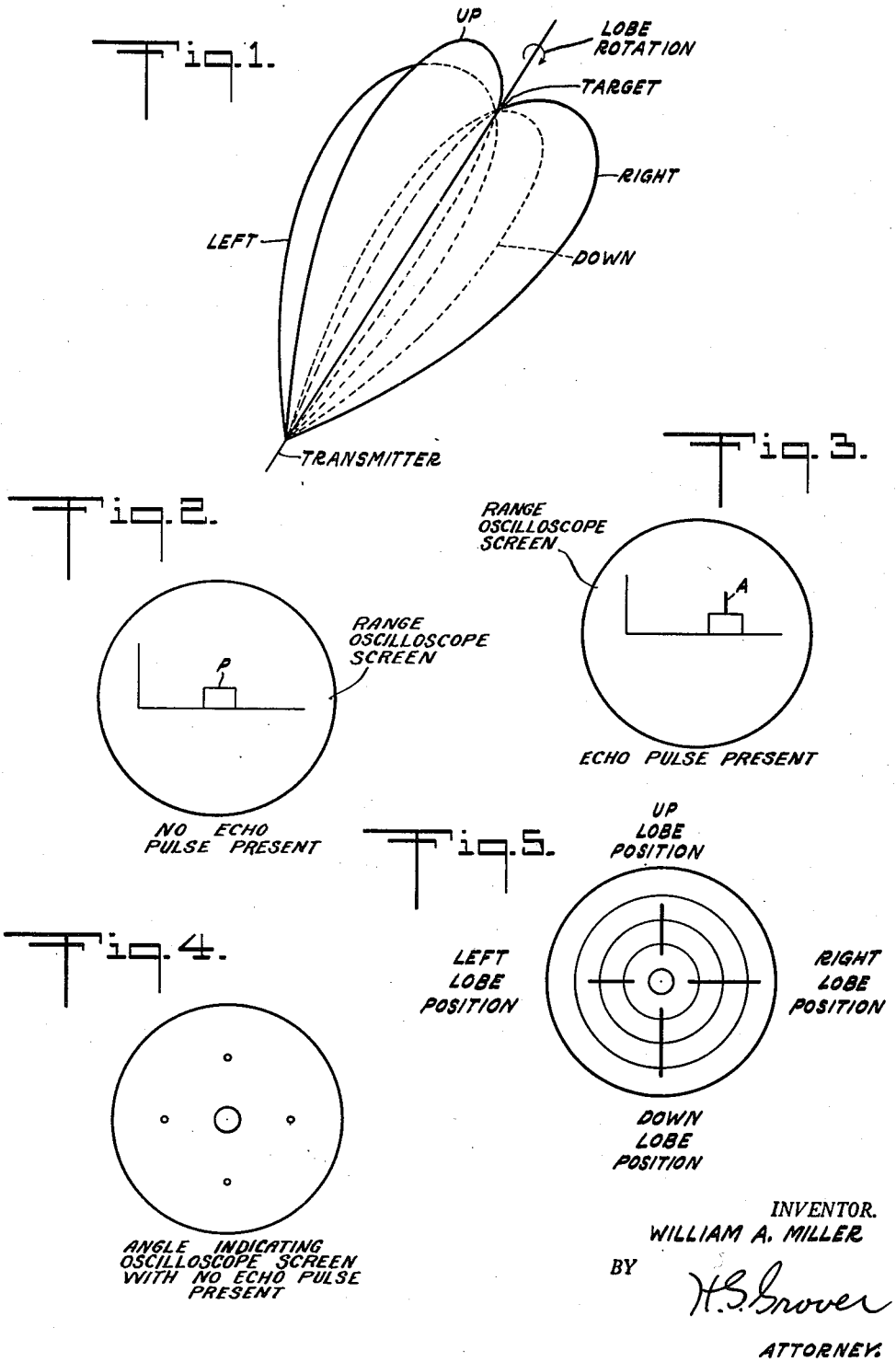

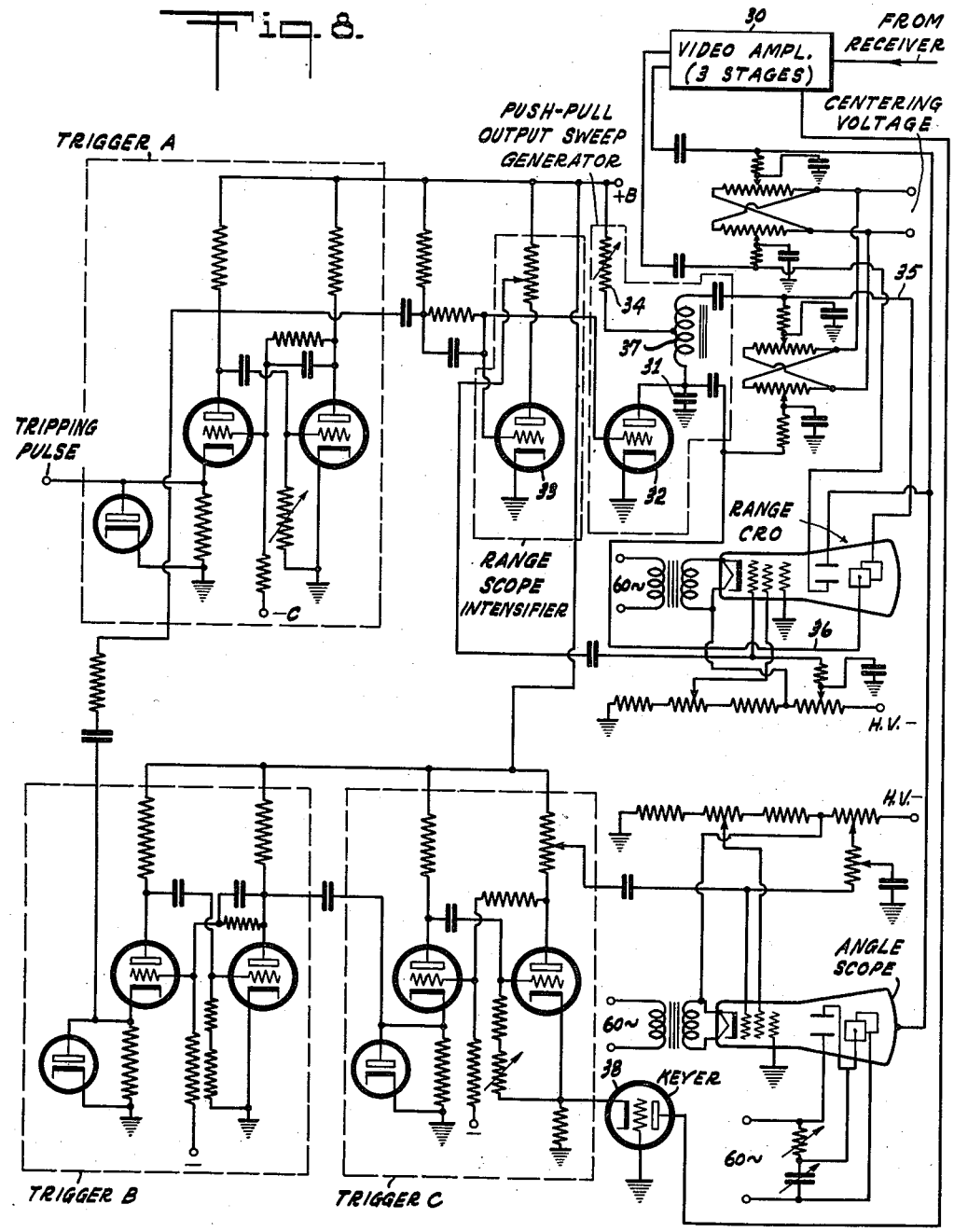

Patented July 3, 1951

2,559,511

UNITED STATES PATENT OFFICE 2,559,511

OBJECT DETECTION SYSTEM UTILIZING RADIO PULSES

William A. Miller, Port Jefferson, N. Y., assignor to Radio Corporation of America, a corporation of Delaware Application April 27, 1944, Serial No. 532,929

2 Claims. (Cl. 343—11)

This invention relates to improvements in object detection and location system utilizing pulses of radio frequency energy for determining the exact location of an object. The invention is particularly useful as a radio locator of airplanes and ships, and has both military and commercial applications.

An object detection and location system (sometimes referred to as a radio locator) has been proposed and is desscribed in a copending application Serial No. 501,050, filed September 3, 1943, now Patent No. 2,470,939, issued May 24, 1949, wherein a lobe switching or conical scanning system is employed. Such a lobe switching system involves causing a directive antenna system to sequentially assume four different patterns or lobes corresponding to the four quadrants of a circle. This is done by causing a small deflection of a radio beam at regular intervals through the four quadrants of a circle which is perpendicularly located to the mean axis of the beam, by means of a spinning radiating element positioned off the center or focus of a parabolic reflector, or by spinning a deflecting element off the focus of the parabolic reflector. If a spinning radiating element is employed, it may be rotated around one end as an axis, or, preferably the entire radiating element rotated around a circle without changing its polarization, as by nutation. This type of lobe switching antenna, when employed for radio locating purposes, is able to produce beam deflections at regular intervals when driven by a synchronous motor, and is freely movable in all directions under the manual control of the operators for scanning purposes and for pointing the antenna directly on the object to be detected. The antenna thus scans a cone of revolution in the space ahead of the system. This type of object detection and locating system employs a transmitter for transmitting periodically repeated ultra short radio wave pulses of extremely short duration. A receiver is used to receive the echo pulses which are reflected back from the object to be detected.

In the system described in the copending application supra, the spinning antenna is driven by a motor at about sixty revolutions per second. At this speed of rotation, the pulses of ultra high frequency energy are radiated 240 times per second corresponding to a pulse for each quadrant position of each revolution of the antenna. The up and down beam firing positions of the radiating element are used to determine the elevation or vertical position of the object to be detected and located, while the right and left beam firing positions of the radiating element are used to determine the azimuthal or horizontal position of the same object. The radiation patterns or lobes of the beam will, of course, be different for different quadrants of the circle as the radiating element rotates. The antenna system is so designed that the ears of the radiation patterns or lobes overlap in the up and down beam firing positions and also overlap in the right and left beam firing positions. Since the time interval between radiated pulses is quite long compared to the time of each pulse, it will be understood that a pulse reflected by a remote object to be detected will be received at the receiver located adjacent the transmitter during the same quadrant of rotation in which the original pulse is radiated. As an illustration, the pulse radiated during each quadrant position of each revolution of the antenna may have a duration of the order of one or two microseconds.

If the pulses which are reflected from a remote target or object are of equal intensity and if they were radiated in the up-and-down positions of the rotating radiating element, they will be received during the same up-and-down positions, and if the radiated pulses were of equal intensity, it follows that the horizontal plane of the antenna system is pointed at the object. If the reflected pulses received during the right and left positions of the rotating radiating element are also of equal intensity, it follows that the vertical plane of the antenna system is also pointed at the object. Under these conditions, the target or object to be detected is in a direct line with the focus of the antenna. If now, the parabolic reflector of the antenna is made of widely spaced wires in mesh formation, and the object is within visual distance, the illumination of a searchlight placed directly behind the reflector will illuminte the object. It will be apparent that although the vertical plane referred to above is always vertical regardless of the orientation of the light, the horizontal plane is actually only "horizontal" when the antenna and reflector are in such position that the beam would be projected tangent to the earth's surface.

If the received pulses reflected from the object are of unequal intensity, it is an indication that the antenna system is not pointed directly at the object, but to one side of the object.

The echo or reflected pulses which are received are viewed on a pair of oscilloscopes, of which one indicates the pulses received during the upand-down positions of the rotating radiating element, and the other indicates the pulses received during the right and left positions of the rotating radiating element. A third oscilloscope is utilized to determine the range or distance of the target (object being detected) from the radio locating equipment.

The same general principles thus far described for object detection and location are also utilized in the practice of the present invention; however, this invention comprises a simplified and improved system for detecting and locating objects by means of pulses and their echoes. Briefly stated, the improvement of the present invention comprises utilizing a single oscilloscope for determining both the azimuthal and elevation positions of the target. This single oscilloscope is hereinafter referred to as the angle indicating scope, and is of the type in which a beam can be made to traverse a circle on the face or screen of the tube, while at the same time a radial deflecting voltage can be applied to a subsidiary electrode.

A detailed description of the invention follows in conjunction with a drawing, wherein:

Fig. 1 illustrates the antenna pattern of a lobe switching system employed in the present invention;

Figs. 2 and 3 diagrammatically illustrate pictures on the range oscilloscope of the invention under the two conditions when there are no echo pulses present and when there are echo pulses present;

Fig. 4 illustrates the appearance of visual markings on the screen of the angle indicating oscilloscope used in the invention under one condition of operation;

Fig. 5 illustrates the appearance of visual markings on the screen of the angle indicating oscilloscope under another condition of operation;

Fig. 6 diagrammatically illustrates an embodiment of the object detection system of the present invention;

Fig. 7 is a series of graphs given in explanation of the operation of the system of Fig. 6; and Fig. 8 illustrates the circuit details of the system of Fig. 6.

In brief, the present invention makes use of two oscilloscopes or cathode ray tubes; one for indicating range or distance of the target or object from the apparatus of the invention, and the other for indicating both the azimuth or horizontal position and elevation or vertical position of the object to be detected. With these two oscilloscopes, it is possible to determine immediately the range, and to train the antenna exactly on the target. The invention gives a positive indication of the direction in which to turn the antenna to correct for error in pointing. The azimuth and elevation indicator, or angle indicator, shows the magnitude and direction of the pointing error and does not indicate actual bearing and azimuth in degrees or mils.

Referring to Fig. 1, there is shown the antenna pattern of a lobe switching system with which the system of the invention is designed to function. There are shown four radio frequency lobes corresponding to the up, right, down and left quadrants of the circle, in which the antenna rotates. The direction of lobe rotation is shown by the arrow, although it should be understood that the operation of the indicating equipment is independent of the direction of lobe rotation. The transmitter is located at the apex of the overlapping lobes. The antenna will be pointed exactly on the target or object being located when the latter is at the point of intersection of all four lobes. This point is designated by the legend "target."

Fig. 6 shows in block diagram the complete obstacle detection ratio locating system of the invention. This system includes a transmitter 10 and a receiver 20, both coupled through a TR box to the offset dipole antenna 9, and a multiplicity of associated circuits described in more detail hereinafter, connected with the two oscilloscopes. The range oscilloscope is a cathode ray device of conventional type having vertical and horizontal deflection elements such as plates. The angle indicating oscilloscope is a cathode ray tube constructed in such manner that the electron beam seen on the screen traverses a circle. A subsidiary electrode R on the angle scope is provided to which the radial deflecting voltage is applied. The intensity of the spot on the screen is capable of modulation by pulses applied to the intensity control grid N. Such an oscilloscope is available and known in the art. The angle indicating scope is connected in such manner that the electron beam spot on the screen traverses a circular path in synchronism and in a 1:1 relation with the antenna lobe rotation. This means that the spot should travel once over the circle each time that the lobes are switched through four consecutive quadrants. The term "scope" will be used herein as an abbreviation for the word "oscilloscope." The letters CRO above the legend for each scope are the first letters of the words "cathode ray oscilloscope." A single motor M is employed to drive the antenna 9 and the transmitter 10. The motor M is preferably a synchronous motor and drives the transmitter 10 via a shaft S. The dipole 9 is located off the center of a parabolic reflector, preferably of the mesh type, behind which is located a searchlight (not shown). The motor M is arranged to rotate the antenna at a speed of sixty revolutions per second, whereas the transmitter 10 is designed to fire or deliver a pulse of radio frequency energy to the dipole 9 during each quadrant position of each revolution of the dipole antenna. Thus, the transmitter 10 will deliver 240 pulses per second to the dipole antenna. Transmitter 10 is preferably of the magnetron type, and so arranged as to deliver pulses of the order of one or two microseconds duration to the antenna. The receiver 20 receives the pulse reflected from the object to be detected and located. Both the receiver and the transmitter are connected to the same antenna 9 through the TR box. This TR box is a device which serves to uncouple the receiver from the antenna while the transmitter is transmitting a pulse and to uncouple the transmitter from the antenna when the transmitter is not in actual operation, so that between transmitted pulses maximum received power from the antenna may be delivered to the receiver. Several such TR devices have been developed for use with military ratio locating pulse systems, and different ones are described in applications now pending in the United States Patent Office. One suitable TR device is described in application Serial No. 477,435, filed February 27, 1943, by Nils E. Lindenblad, and another suitable TR device is described in application Serial No. 466,274, filed November 20, 1942, by E. I. Anderson.

The transmitter 10 may comprise any one of the systems of the type described by Lindenblad in his copending applications Serial No. 477,779, filed March 2, 1943, now Patent No. 2,402,422 issued June 18, 1946, or Serial No. 479,220 filed March 15, 1943, now Patent No. 2,449,078 issued September 14, 1948, preferably the former, as illustrated in Fig. 2 thereof, or any other suitable obstacle detection transmitter.

The output of the receiver is coupled by way of a video amplifier 30 (having a push-pull output) to the vertical deflection plates of the range scope, as shown. The range scope is operated in such a way that the distance from the origin of the sweep to the position of the video echo or reflected pulse on this scope is proportional to the distance from the observer to the target. The beam or ray spot on the range scope sweeps out a path (as shown in Fig. 2) in the absence of any echo or reflected pulses. If there are echoes present, corresponding to pulses reflected from the target or other objects, they will appear as shown by the vertical line A in Fig. 3, assuming the presence of an object or target which reflects pulses. The operator has available a positioning control for the pedestal P (note Figs. 2 and 3) and is able to choose any one of the echo pulses returned from a plurality of targets, let us say the one labeled A in Fig. 3, under which he positions the pedestal. This pedestal P is merely a local pulse generated in the apparatus of Fig. 6, and impressed upon the range scope, as will be described in more detail hereafter.

The pedestal pulse P is also the "intensifier pulse" for the angle indicating scope. The "intensifier pulse" is that pulse which is applied to the control grid of the oscilloscope in order to overcome the cut-off bias normally applied to this grid and thus render the cathode ray beam visible. At this time, it should be understood that both the range and the angle indicating scopes are normally biased to cut-off (i. e., biased to prevent the electron beam from reaching the fluorescent screen) and require intensifier pulses to render the cathode ray beams visible. The pedestal pulse P for the range scope is made to occur simultaneously with the intensifier pulse applied to the control electrode N of the angle indicating scope.

Fig. 4 shows the appearance of the screen of the angle indicating scope when there is no video echo pulse, or even in the presence of video echo pulses if the pedestal P is not positioned under an echo. The screen is shown illuminated in four places spaced 90 degrees apart corresponding to the four lobe positions. If the pedestal pulse P on the range scope is positioned underneath an echo pulse, then the video echo pulse applied to the radial deflecting electrode R simultaneously with the occurrence of the pedestal pulse on the control electrode N will be rendered visible as a radial line. Since there is a one-to-one correspondence between the spot position on the angle scope and the lobe position of the antenna, and the oscilloscope is properly oriented (to wit, the up lobe corresponds to the spot in the up position, the right lobe corresponds to the spot in the right position, etc.) the video echo pulses rendered visible on the screen of the angle scope in the form of radial lines are the signals necessary for pointing the equipment at the selected target, and it is so arranged that the video echo signals are from quadrants as labeled in Fig. 5. A scale in the form of concentric circles placed in front of the angle scope, as shown in Fig. 5, enables the operator to match the amplitudes of the two vertical radial lines in order to obtain the proper elevation angle, and to match the amplitudes of the two horizontal radial lines in order to obtain the proper bearing or azimuth angle.

Fig. 5 shows the possible appearance of the echo signals on the angle scope when the antenna is pointed to the right and below the target, after the pedestal P has been positioned under a particular echo pulse corresponding to the target upon which the antenna is to be trained. It should be noted that the two vertical radial lines of different lengths represent the elevation while the two horizontal radial lines of different lengths represent the azimuth. These lines give an indication of the direction in which to turn the antenna to correct for error in pointing the antenna. Corrections of the direction of pointing of the antenna equalizes the lengths of the two vertical lines and also equalizes the lengths of the two horizontal radial lines on the screen of the angle scope.

A more detailed description of the system of Fig. 6 will now be given, with particular reference to the graphical representation of Fig. 7. The curves of Fig. 7 (indicated by different reference letters) represent various wave forms of pulses and their phase relations as they appear in the system of Fig. 6. The same reference letters have been shown in Fig. 6 at points where these pulses appear in the system. The pulses of Fig. 7 are accurately shown in their correct relative phase relations, although they are not drawn to absolute amplitude scale. The transmitter 10 is arranged so that every time a radio frequency pulse is emitted from the antenna 9, there will be a direct current pulse A (note Fig. 7) impressed on trigger A over lead 11 and through trigger A to trigger B over lead 12. Thus, there will be 240 direct current A pulses per second supplied by the transmitter 10, one produced for each lobe or quadrant, assuming a speed of sixty revolutions per second for the antenna. Trigger A is adjusted so that its output pulse looks like pulse C (Fig. 7) and this pulse has the necessary time duration for the distance range to be observed. The C pulse, it should be noted, has a duration much longer than the A pulse and, by way of example, may have a time duration of 300 microseconds to cover a range of 50,000 yards between the antenna and the object to be detected or observed.

The output of trigger A, namely, pulse C, is impressed via lead 13 on a tube labeled "Range scope intensifier," which tube produces the intensifier pulse D for the range cathode ray oscilloscope. An inspection of Fig. 7 will show that the pulse D is inverted with respect to and of the same length as pulse C. The output pulse C is also impressed over lead 14 onto the sweep generator circuit for the range scope in order to produce a saw-tooth wave form E (Fig. 7). Pulse C is of negative character and starts the sweep generator and controls the duration of the saw-tooth voltage wave. It should be noted that the durations of the pulse C and the saw-tooth voltage wave E match each other in time, and that the intensifier pulse D also has substantially the same time interval. This saw-tooth wave form E is given a push-pull output and then impressed on the horizontal plates of the range scope over leads 7 and 8. Thus, every time a pulse is transmitted by transmitter 10, the range scope forms a picture (shown in Fig. 3), assuming the presence of an echo from a target in order to demonstrate the principles of operation, and also assuming that the pedestal P is arranged under one selected echo pulse in a manner described in more detail hereinafter. The output of trigger B is shown as F (Fig. 7) while the output of trigger C upon which the F pulse is impressed is shown as G (Fig. 7). Triggers B and C combine to form an embodiment of the type described in my copending application, Serial No. 447,633, filed June 19, 1942, now U. S. Patent No. 2,402,917, granted June 25, 1946.

The purpose of the combined trigger units B and C is to provide an electronic circuit furnishing an output pulse of controllable time duration and which starts a controllable time later than an input pulse. The arrows shown on the pulses F and G indicate variable duration or delays under control of the operator. The output pulse of trigger C (designated by G) is delayed in a variable amount in time by controlling the pulse length of trigger B. The length of output pulse from trigger C is constant in time. The output of trigger C is, among other things, connected to the range CRO via the keyer 38 and lead 15 to produce the pedestal P of Fig. 2. The pulse G is keyed in such manner by the keyer 38 as to appear as a pedestal pulse on the range CRO, and the position of this pedestal pulse is variable under control of the operator assigned to the range CRO. This pulse G is also used to intensify the angle CRO via lead 19 and control grid N.

In order to give correct indication, it is necessary that the system of the invention be able to distinguish between lobe left and lobe right (for azimuth), and between lobe up and lobe down (for elevation), and this information should be presented at the proper time and on the proper scope.

The deflection plates on the angle indicating scope is supplied with energy from a phase splitting network 17 which applies a sine wave to the two pairs of deflecting plates at a 90 degree phase relation in order to produce a circular trace on the screen when the grid N permits the electron beam to pass therethrough. The phase splitting network is supplied with alternating current 60-cycle energy which is suitably synchronized with the antenna lobe rotation.

As an aid in visualizing the operation of the invention, let us assume the lobe is in the "up" position. The transmitter 10 fires, producing pulse A which is supplied to the triggers A and B. Trigger A controls the range sweep, while trigger B controls the time delayed pulse from trigger C. This time delayed pulse G from trigger C is impressed on the range scope and its time delay is so arranged that it appears as a pedestal under one of the echo pulses, as shown in Fig. 3. This occurs every time a pulse is transmitted and for the assumed echoes from the receiver all pictures on the range scope will appear the same as shown in Fig. 3.

Simultaneously with the operation of trigger C, the pulse G is impressed on the control grid N of the angle CRO, rendering the spot visible on the circular trace on the screen. The video or echo signal impressed on electrode R from the output of the video amplifier 30 then traces the vertical line indicated on Fig. 5 on the angle CRO under the "up" lobe, and this vertical line is proportional to the signal strength of the echo returning from the target in this particular lobe.

Next, the lobe swings "right" and the transmitter 10 pulses again, starting all circuits interconnected with it anew. The video or echo signal from the same target and received during the right lobe position is impressed on the electrode R as before, and the video echo signal traces out a horizontal radial line indicated on the angle CRO as the "right" lobe position, it being understood that the pedestal pulse has simultaneously intensified the angle scope. It will be seen that we now have one signal on the angle scope for lobe "up" and one signal on the angle scope for lobe "right."

The same sequence of operation occurs when the transmitter 10 pulses again in the "down" and "left" lobe positions. In the "down" position, the radial line produced by the echo pulse is vertical, while in the left position, the radial line produced by the echo pulse on the angle scope is horizontal.

Since the transmitted pulse recurrence rate is greater than the flicker rate of vision, the picture presented on the fluorescent screens of the range and angle scopes appears continuous and similar to those shown in Figs. 3 and 5.

When the angle scope is as shown in Fig. 5, the antenna controls are manually operated until the azimuth marks (horizontal) are of equal size and the elevation markings (vertical) also of equal size. When these markings are equal, then the target will be exactly centered as in Fig. 1; that is, at the point of intersection of all four lobes. A searchlight positioned behind the antenna can then be turned on and will illuminate the target. In practice, there will be individual operators for each of the range and angle scopes. The operators for these two scopes will have separate controls for manually turning the antenna, and these operators will inform the range operator when the markings are of equal size, at which time the range operator can push a button to turn on the searchlight.

The circuit details of the system of Fig. 6 are shown in Fig. 8, but this last figure does not show the pulse transmitter apparatus, the receiver, or the TR box indicated by the rectangles of Fig. 6, since no claim of invention is made to these circuits per se. The circuits enclosed within the boxes of Fig. 8 which correspond to the boxes of Fig. 6, have been labeled with the same legends.

Trigger A is an unbalanced trigger (having one degree of electrical stability). The trigger includes two vacuum tube electrode structures whose grid and anode electrodes are interconnected regeneratively. It should be noted that the A pulses from the transmitter are supplied to the cathode of one of the electrode tube structures of this trigger.

The range scope intensifier apparatus 33 and to some extent the range scope sweep generator 32 is described in detail in copending application Serial No. 501,764, filed September 10, 1943, now Patent No. 2,431,766, issued December 2, 1947. Both of these pieces of apparatus are described in my copending application Serial No. 526,745, filed March 16, 1944, now Patent No. 2,503,060 issued April 4, 1950. The triode structures 33 and 32 shown for both of these pieces of apparatus are normally biased to pass current, and the negative pulse C from the trigger A has such magnitude that it momentarily causes both of these triode structures to stop passing current, thus producing the positive intensifier pulse D which is applied to the control grid of the range scope, and enabling a charge to build up gradually on the condenser 31 in the output of the sweep generator triode 32. This condenser 31 discharges through the triode 32 when the pulse C terminates, at which time the triodes 32 and 33 will again pass current. The high values of resistors in the grid circuits of these two triode structures enables only that portion of the C pulse to be utilized which has the greatest rate of change at the beginning and end.

Triggers B and C are unbalanced triggers (having one degree of electrical stability) which together comprise a circuit for delaying a pulse by a desired interval. These triggers are similar to the system described in my U. S. Patent No. 2,402,917, supra, with the exception that the cathodes of these two triggers are fed with triggering pulses.

The range scope intensifier pulse applied to the first grid of the range scope is supplied from a triode tube 33 operated in a positive grid thresholding circuit. A negative input pulse applied to the grid of this tube from trigger B causes essentially no response in the plate current until a certain negative or thresholding level is reached, after which a further increase in the negative voltage applied to the grid of the tube cuts off the plate current and a positive voltage pulse of steep leading and trailing edges is produced in the plate circuit. This triode tube passes current in the absence of a negative input pulse.

Normally, in the absence of a negative output pulse from trigger A and while tube 32 is conducting, there is a low impedance path between the terminals of condenser 31 through the tube 32. The application of a negative pulse to the grid of tube 32 from the output of trigger A renders tube 32 non-conducting and thus permits a charge to build up on condenser 31 through resistor 34. The charge on condenser 31 will build up until the end of the rectangular output pulse from trigger A which will occur when the trigger A returns to its stable state, at which time tube 32 will again pass current and discharge condenser 31 through the low impedance space path of tube 32 in its current passing condition. A sawtooth waveform having a frequency of 240 waves per second corresponding in frequency to the transmitted pulses is thus built up across the condenser 31 and is applied over leads 35, 36 to the horizontal deflection plates of the range scope. By connecting an inductance coil 37 in the anode circuit of tube 32 and connecting resistor 34 to the midpoint of coil 37, and by a proper selection of the values elements 31, 34 and 37, I am able to generate a push-pull sawtooth voltage wave (available in leads 35, 36) of sufficient linearity to be used as the sweep voltage for scanning the range scope. The voltage at one terminal of coil 37 is always of opposite instantaneous polarity to that at the other terminal of this coil.

Although the specification has made reference to 60 cycle synchronous operation of the system, it should be understood that this assumption has been made merely for purposes of exposition. Actually, the main frequency is not limited to 60 cycles, and as a matter of fact, motor M might be an induction motor which is non-synchronous (or even a D.-C. motor). In such a case, since the motor M has control of the transmitter, the only thing necessary is to connect a small A.-C. generator such as a "Selsyn" generator to the shaft of M to provide a circular sweep for the angle indicating oscilloscope. The entire phase shifting network shown in Fig. 8 may be omitted if a two-phase Selsyn generator is used.

The video amplifier 30 is of a type known in the art. It is described in detail in copending application Serial No. 501,050, filed September 3, 1943, supra, and consists of a three stage shunt-compensated video amplifier circuit. Each stage has inductance in its anode circuit for compensating for the output capacitance of its own stage and for the input capacitance of the succeeding stage and for the stray lead capacitance. Output from the last stage of this video amplifier is taken in push-pull, i. e., from the cathode and anode, to provide symmetrical deflection of the range scope.

The output from trigger C is arranged by means of triode keyer 38 to appear at the anode of the last stage of the video amplifier as a negative pulse of the same polarity as any video pulse which might appear at this same anode. Thus instead of applying the G pulses of Fig. 7 directly to the bottom vertical deflection plate of the range scope, as shown in Fig. 6, in practice the output of trigger C causes the video amplifier to apply a negative pulse to this deflection plate. Tube 38 is a grounded grid tube which is cut-off (non-conductive) in the absence of pulses from trigger C. A negative pulse from trigger C to the cathode of tube 38 allows this tube to pass current and thus causes a voltage drop to appear at the anode of the last stage of the video amplifier.

I claim:

1. In a radio locating system, in combination, a rotatable antenna, a pulse transmitter coupled to said antenna, means for causing said transmitter to produce pulses of electromagnetic wave energy at a rate four times faster than the speed of rotation of said antenna, and common drive means for synchronizing the rotation of said antenna with the operation of said transmitter, whereby said transmitter sends out a pulse for each quadrant of the circle of rotation of said antenna, a receiver coupled to said antenna, range and angle indicating oscilloscopes having ray deflection elements coupled to the output of said receiver, a control grid for each of said oscilloscopes and normally biased to prevent passage of the cathode ray beam therethrough, circuits coupled to and under control of said transmitter for substantially simultaneously overcoming the cut-off bias on said control grids a predetermined interval of time after said transmitter produces a pulse, whereby the beams of said oscilloscopes become simultaneously visible on the respective screens thereof, and means in circuit with said angle indicating oscilloscope for causing the beam thereof to traverse a circular path of constant diameter in synchronism and in a one-to-one relation with the rotational speed of said antenna.

2. In a radio locating system, in combination, a rotatable antenna, a pulse transmitter coupled to said antenna, means for causing said transmitter to produce pulses of electromagnetic wave energy at a rate four times faster than the speed of rotation of said antenna, and common drive means for synchronizing the rotation of said antenna with the operation of said transmitter, whereby said transmitter sends out a pulse for each quadrant of the circle of rotation of said antenna, a receiver coupled to said antenna, range and angle indicating oscilloscopes having ray deflection elements coupled to the output of said receiver, a control grid for each of said oscilloscopes and normally biased to prevent passage of the cathode ray beam therethrough, circuits coupled to and under control of said transmitter for substantially simultaneously overcoming the cut-off bias on said control grids a predetermined interval of time after said transmitter produces a pulse, whereby the beams of said oscilloscopes become simultaneously visible on the respective screens thereof, and means in circuit with said angle indicating oscilloscope for causing the beam thereof to traverse a circular path of constant diameter in synchronism and in a one-to-one relation with the rotational speed of said antenna, said ray deflection element for said angle indicating oscilloscope being a radial beam deflection electrode for deflecting the circularly traveling cathode ray beam of said angle indicating oscilloscope.

WILLIAM A. MILLER.

REFERENCES CITED

The following references are of record in the file of this patent:

UNITED STATES PATENTS

| Number | Name | Date |
|---|---|---|
| 2,082,347 | Lieb et al. | June 1, 1937 |
| 2,083,242 | Runge | June 8, 1937 |
| 2,189,549 | Hershberger | Feb. 6, 1940 |
| 2,208,378 | Luck | July 16, 1940 |
| 2,227,598 | Lyman et al. | Jan. 7, 1941 |
| 2,231,929 | Lyman | Feb. 18, 1941 |
| 2,400,641 | Hardy | May 21, 1946 |
| 2,402,916 | Schroeder | June 25, 1946 |
| 2,412,702 | Wolff | Dec. 17, 1946 |
| 2,416,088 | Deerhake | Feb. 18, 1947 |
| 2,423,104 | Labin | July 1, 1947 |
| 2,426,182 | DeLange | Aug. 26, 1947 |
| 2,426,654 | White | Sept. 2, 1947 |
| 2,449,976 | Busignies | Sept. 28, 1948 |

FOREIGN PATENTS

| Number | Country | Date |
|---|---|---|
| 497,147 | Great Britain | Dec. 9, 1938 |
| 526,658 | Great Britain | Sept. 23, 1940 |
| 542,634 | Great Britain | Jan. 21, 1942 |